(12) United States Patent
Haley, III

(10) Patent No.: US 7,862,890 B2
(45) Date of Patent: Jan. 4, 2011

(54) BIOMEDIA APPARATUS AND METHOD OF USE

(75) Inventor: John W. Haley, III, Providence, RI (US)

(73) Assignee: BioProcess Technologies, Ltd., Portsmouth, RI (US)

( * ) Notice: Subject to any disclaimer, the term of this patent is extended or adjusted under 35 U.S.C. 154(b) by 0 days.

(21) Appl. No.: 11/614,700

(22) Filed: Dec. 21, 2006

(65) Prior Publication Data

US 2007/0151923 A1   Jul. 5, 2007

Related U.S. Application Data

(60) Provisional application No. 60/754,053, filed on Dec. 27, 2005.

(51) Int. Cl.
*B32B 15/00* (2006.01)
(52) U.S. Cl. .................. 428/375; 428/373; 428/374; 428/399; 210/150; 210/196; 210/610
(58) Field of Classification Search .......... None
See application file for complete search history.

(56) References Cited

U.S. PATENT DOCUMENTS

| | | | |
|---|---|---|---|
| 681,884 A | 9/1901 | Monjeau |
| 877,569 A | 1/1908 | Joseph |
| 968,015 A | 8/1910 | Wilkie |
| 978,889 A | 12/1910 | Imhoff |
| 2,008,507 A | 7/1935 | Laughlin |
| 2,141,979 A | 12/1938 | Orin et al. |
| 2,142,196 A | 3/1939 | Langdon |
| 2,220,859 A | 1/1940 | Bispham et al. |
| 2,308,866 A | 1/1943 | Dekema |
| 2,580,764 A | 1/1952 | Gunz |
| 3,231,490 A | 1/1966 | Fry |
| 3,238,124 A | 3/1966 | Burton |
| 3,275,147 A | 9/1966 | Glide |
| 3,407,935 A | 10/1968 | Burton |
| 3,835,039 A | 9/1974 | Ciambrone |
| 3,876,542 A | 4/1975 | Carlson |
| 4,011,162 A | 3/1977 | Oldham et al. |
| 4,088,571 A | 5/1978 | Helgesson |

(Continued)

FOREIGN PATENT DOCUMENTS

DE   10132546 C1   6/2003

(Continued)

OTHER PUBLICATIONS

International Search Report and Written Opinion dated Oct. 4, 2007 in PCT/US06/62506.

*Primary Examiner*—Jill Gray
(74) *Attorney, Agent, or Firm*—Wildman, Harrold, Allen & Dixon LLP

(57) ABSTRACT

A biomedia apparatus comprising an elongated central core and a plurality of loops positioned along the central core adapted to collect organisms from water. The biomedia apparatus may further comprise at least one reinforcing member associated with the central core. In one embodiment, the biomedia apparatus is utilized in a trickle tower to treat wastewater. In another embodiment, the biomedia apparatus is utilized outside a power plant to minimize spat that is drawn into the plant through water intake valves.

20 Claims, 2 Drawing Sheets

U.S. PATENT DOCUMENTS

| | | | |
|---|---|---|---|
| 4,181,514 A | | 1/1980 | Lefkowitz et al. |
| 4,411,780 A | * | 10/1983 | Suzuki et al. ............... 210/150 |
| 4,422,930 A | | 12/1983 | Hatanaka |
| 4,451,362 A | | 5/1984 | Spelsberg |
| 4,504,393 A | | 3/1985 | Davies |
| 4,690,849 A | * | 9/1987 | Fukuda et al. ................ 428/91 |
| 4,717,519 A | | 1/1988 | Sagami |
| 4,729,828 A | | 3/1988 | Miller |
| 4,895,645 A | | 1/1990 | Zorich, Jr. |
| 4,929,484 A | | 5/1990 | Basse |
| 5,011,605 A | | 4/1991 | Pape et al. |
| 5,085,766 A | | 2/1992 | Born |
| 5,160,395 A | * | 11/1992 | Basse et al. ................. 156/269 |
| 5,232,676 A | | 8/1993 | Wolff et al. |
| 5,389,248 A | | 2/1995 | Pare et al. |
| 5,397,474 A | | 3/1995 | Henry |
| 5,399,266 A | | 3/1995 | Hasegawa et al. |
| 5,423,988 A | * | 6/1995 | Yamasaki et al. ........... 210/611 |
| 5,526,656 A | | 6/1996 | Conroy, Jr. et al. |
| 5,549,828 A | | 8/1996 | Ehrlich |
| 5,580,644 A | * | 12/1996 | Minami ...................... 428/221 |
| 5,585,266 A | | 12/1996 | Plitt et al. |
| 5,587,239 A | * | 12/1996 | Ueba et al. .................. 428/362 |
| 5,622,630 A | | 4/1997 | Romano |
| 5,771,716 A | * | 6/1998 | Schlussel ...................... 66/195 |
| 5,863,433 A | | 1/1999 | Behrends |
| 5,958,239 A | | 9/1999 | Sing |
| 5,976,377 A | | 11/1999 | Hyfantis, Jr. et al. |
| 5,997,972 A | | 12/1999 | Basse |
| 6,015,618 A | * | 1/2000 | Orima ......................... 428/373 |
| 6,238,563 B1 | | 5/2001 | Carroll, II et al. |
| 6,241,889 B1 | | 6/2001 | Haley, III |
| 6,274,035 B1 | | 8/2001 | Yuan et al. |
| 6,319,407 B1 | | 11/2001 | Maatta et al. |
| 6,406,630 B1 | | 6/2002 | Henry |
| 6,875,344 B2 | | 4/2005 | Haley, III |
| 6,881,340 B2 | | 4/2005 | Haley, III |
| 6,884,342 B2 | | 4/2005 | Haley, III |
| 6,939,462 B2 | | 9/2005 | Haley, III |
| 6,955,275 B2 | | 10/2005 | Haley, III |
| 2004/0000518 A1 | | 1/2004 | Haley, III |
| 2007/0151923 A1 | * | 7/2007 | Haley .......................... 210/615 |

FOREIGN PATENT DOCUMENTS

| | | | |
|---|---|---|---|
| EP | 164508 A1 | * | 12/1985 |
| JP | 55147194 A | * | 11/1980 |
| JP | 56058588 A | * | 5/1981 |
| JP | 61293591 A | * | 12/1986 |
| JP | 61293592 A | * | 12/1986 |
| JP | 62083094 A | * | 4/1987 |
| JP | 62097695 A | * | 5/1987 |
| JP | 01034496 A | * | 2/1989 |
| JP | 07108293 A | * | 4/1995 |
| JP | 07299487 A | * | 11/1995 |
| JP | 11309475 A | | 11/1999 |
| JP | 2000246276 A | | 9/2000 |
| JP | 2000254678 A | | 9/2000 |
| JP | 2005066595 A | | 3/2005 |

* cited by examiner

BIOMEDIA APPARATUS AND METHOD OF USE

CROSS REFERENCE TO RELATED APPLICATIONS

This application claims the priority of U.S. Provisional Application Ser. No. 60/754,053 filed Dec. 27, 2005.

FIELD OF THE INVENTION

This invention is directed to a biomedia apparatus, and more particularly to a looped cord biomedia apparatus useful in the treatment of wastewater.

SUMMARY OF THE INVENTION

The present invention relates to a biomedia apparatus and methods for using same.

In one embodiment, the biomedia apparatus of the present invention comprises an elongated central core, at least one reinforcing member associated with the central core and a plurality of loops positioned along a length of the central core.

In another embodiment, the biomedia apparatus of the present invention comprises an elongated central core, wherein a width of the central core is no greater than about 10.0 millimeters and a plurality of loops positioned along the central core.

In yet another embodiment, the biomedia apparatus comprises an elongated central core and a plurality of loops positioned along the central core for collecting organisms from water, wherein the apparatus is adapted to hold about 150.0 to about 300.0 pounds of collected organisms per foot.

In an embodiment of the method of the present invention, the method comprises the steps of providing a biomedia apparatus comprising an elongated central core, at least one reinforcing member associated with the central core and a plurality of loops positioned along the central core, providing water comprising at least one organism and collecting the at least one organism from the water with the biomedia apparatus.

BRIEF DESCRIPTION OF THE DRAWINGS

Certain embodiments of the presently claimed invention are illustrated by the accompanying figures. It should be understood that the figures are not necessarily to scale and that details not necessary for an understanding of the invention or which render other details difficult to perceive may be omitted. It should be understood, of course, that the invention is not necessarily limited to the particular embodiments illustrated herein.

DETAILED DESCRIPTION

As used herein, biomedia means any material or substance used in connection with the treatment of water. The present invention is directed to a looped cord biomedia, which comprises an elongated central core and a plurality of loops positioned along the central core. As used herein, elongated means having a greater vertical dimension than horizontal dimension. In one embodiment, the present invention further comprises a reinforcing member associated with the central core. The biomedia of the present invention may be used in a trickle tower or various other applications involving the treatment of water.

Figure 1:
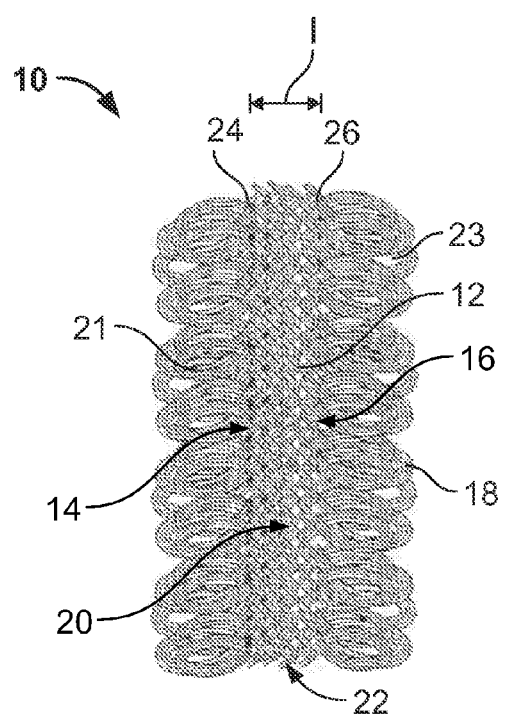
FIG. 1 is a perspective front view of a looped cord biomedia according to the presently claimed invention.

Referring now to FIG. 1, one embodiment of the looped cord biomedia 10 of the present invention is shown. The biomedia of FIG. 1 comprises an elongated central core 12 including a first side 14 and a second side 16, a plurality of loops 18 extending laterally from each of the first and second sides 14 and 16 and a reinforcing member 20 associated with the central core. The biomedia 10 also includes a front portion 21 and a back portion 23.

The central core 12 may be constructed in various ways and of various materials. In one embodiment, the central core 12 is knitted. The knitted portion of the core 12 may comprise a few (e.g., four to six), lengthwise rows of stitches 22. The core 12 may be formed from yarn-like materials. Suitable yarn-like material may include, for example, polyester, polyamide, polyvinylidene chloride, polypropylene and other materials known to those of skill in the art. The yarn-like material may be of continuous filament construction, or a spun staple yarn. The lateral width l of the central core 12 is relatively narrow and is subject to variation. In certain embodiments, the lateral width l is no greater than about 10.0 mm, is typically between about 3.0 mm and about 8.0 mm or between about 4.0 mm and about 6.0 mm.

As shown in FIG. 1, the plurality of loops 18 extend laterally from the first and second sides 14 and 16 of the central core 12. As can be seen, the plurality of loops are designed to collect various types of organisms from water. The plurality of loops offer flexibility in shape to accommodate growing colonies of organisms. At the same time, the plurality of loops 18 permit air circulation so that, when the biomedia is employed in a trickle tower, the growing colonies of organisms can consume sufficient oxygen to survive long enough to eliminate toxins from the wastewater.

The plurality of loops 18 are typically constructed of the same material as the central core 12, and may also include variable lateral widths l'. The lateral width l' of each of the plurality of loops 18 may be within the range of between about 10.0 mm and about 15.0 mm. If the loops are too big, they may become saturated with organisms, which could fall off or preclude the capture of additional organisms.

Figure 2:
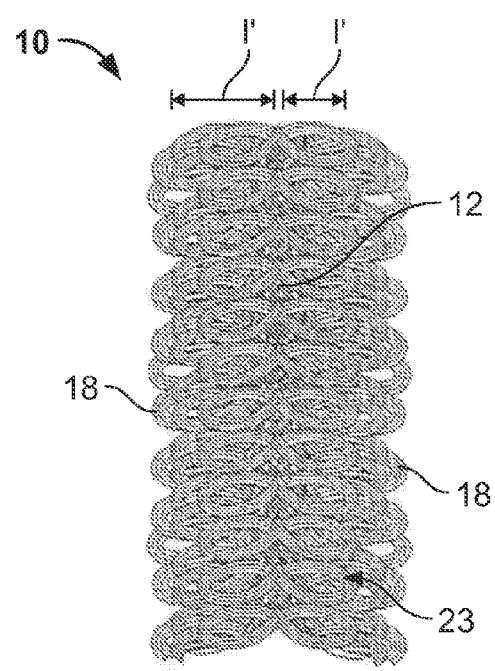
FIG. 2 is a back view of the looped cord biomedia shown in FIG. 1.
Figure 3:
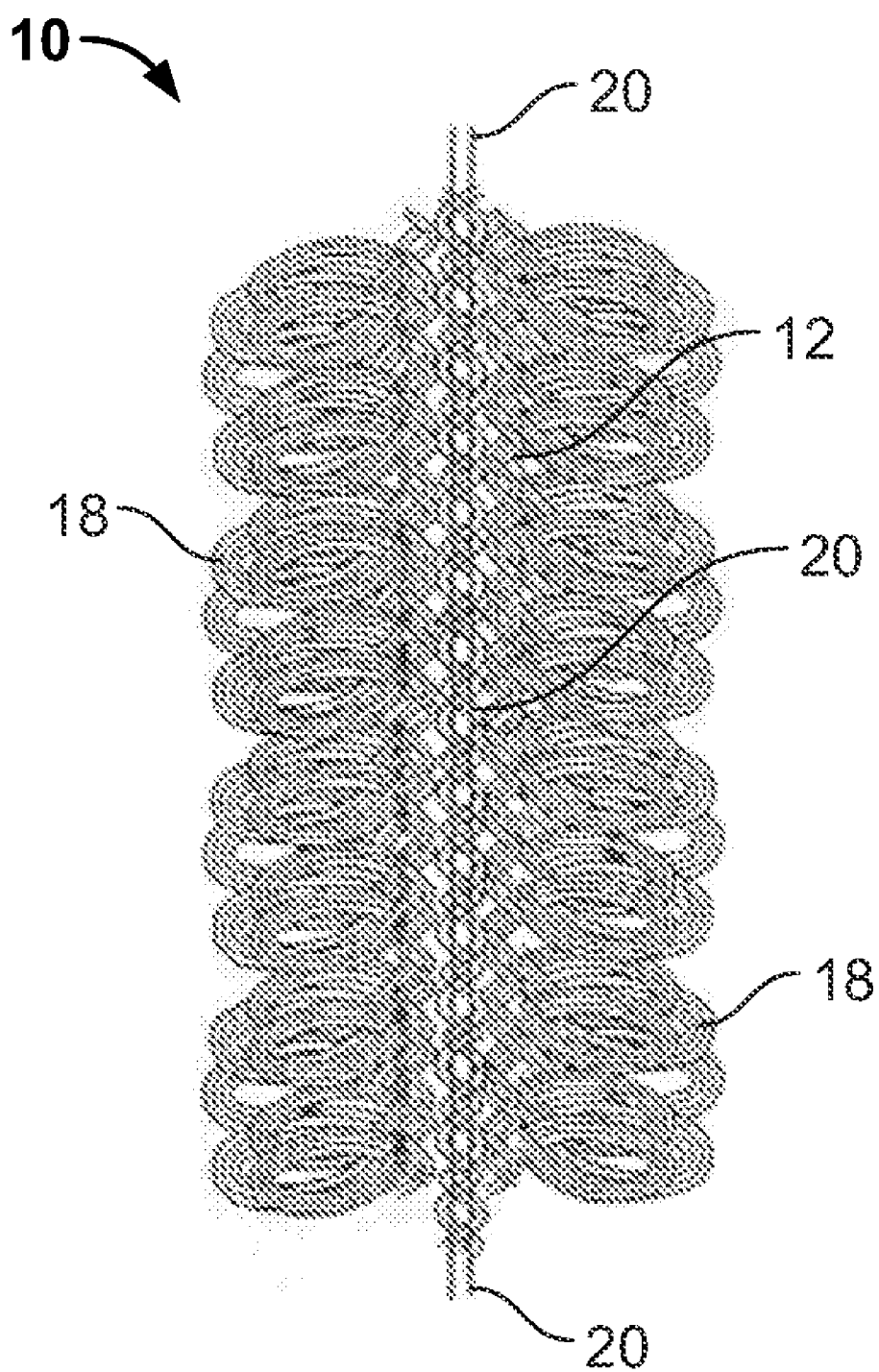

As can be seen, the lateral extent of the core 12 is rather insignificant vis-à-vis the overall lateral extent of each of the plurality of loops. That is, the central core 12 occupies between about 1/7 to 1/5 of the overall lateral width of the biomedia apparatus. In fact, the central core 12 is barely perceptible when viewing the back portion 23 of the biomedia apparatus 10. As seen in FIG. 2, the central core appears nearly totally hidden from view by the laterally extending plurality of loops 18.

The central core 12 may optionally be strengthened through use of the reinforcing member 20, which typically extends along and interconnects with the central core. As used herein, the term reinforcing member means any material or substance added to the central core that is made of a material different than that of the central core. The material of the reinforcing member 20 typically has a higher tensile strength than that of the central core 12 and may have a range of break strengths between about 50.0 pounds and about 15,00 pounds. Thus, the reinforcing member 20 may be constructed of various materials, including high strength synthetic filament, tape and stainless steel wire or other wire. Two particularly useful materials are KEVLAR®, otherwise referred to as a light, strong para-aramid synthetic fiber, and TENSYLON®, otherwise referred to as an ultrahigh molecular weight polyethylene.

According to another aspect of the invention, a method for making the biomedia apparatus is provided. The method comprises the steps of knitting the yarn-like material to form the central core 12, and pulling the plurality of loops 18 therefrom, such that the loops are positioned along the central core 12. Knitting machines available from Comez SpA of Italy may be employed for this purpose. In addition, one or more reinforcing members 20 may be added to the central core 12 in various ways.

A first way in which the biomedia 10 may be strengthened is by adding one or more reinforcing members 20 to the weft of the core 12 during the knitting step. These reinforcing members 20 may be disposed in a substantially parallel relationship to the warp of the core 12 and stitched into the composite structure of the core 12. As will be appreciated, the use of these reinforcing members allows the width of the central core 12 to be reduced relative to central cores of known biomedia, without significantly jeopardizing the tensile strength of the core.

In one embodiment, two reinforcing members 20 are employed, with one member disposed on each side of the core 12. Referring again to FIG. 1, two reinforcing members 24 and 26, in the form of outside wales, are shown.

A second way in which the biomedia 10 may be strengthened is through the introduction of the one or more reinforcing members 20 in a twisting operation subsequent to the knitting step. This method allows the parallel introduction of the tensioned reinforcing members into the central core 12, with the central core 12 wrapping around these reinforcing members 20.

In addition, both the first and second ways of incorporating reinforcing members 20 may be combined. Thus, one or more reinforcing members 20 may be laid into the central core 12 during the knitting process, and then one or more reinforcing members 20 may be introduced during the subsequent twisting step. These reinforcing members 20 could be the same or different (e.g., during knitting, KEVLAR® or a light, strong para-aramid synthetic fiber could be used, and during twisting, stainless steel wire could be introduced).

According to yet another aspect of the present invention, methods for using the above-described biomedia apparatus 10 are provided. The biomedia apparatus 10 may be used in a trickle tower or outside power plants with water intakes.

When used in a trickle tower for treating wastewater, a plurality of the looped cord biomedia strands are suspended vertically in the trickle tower. As the wastewater trickles down the biomedia strands, microorganisms continuously grows on the strands, particularly in and around the loops.

The increasing weight of this biomass tends to cause the biomedia strands to want to stretch or "creep." If this occurs, the biomedia strands can sag and encroach upon their neighbors; as the biomedia grows, this closeness caused by sagging will allow the bacteria to grow together, and thus create "bridging" with consequential deterioration in the wastewater purification process. Owing to the narrow size of the central core 12, however, the above-described biomedia constructions help mitigate this problem of "creep," as the individual biomedia within the trickle tower occupy relatively small lateral widths, allowing for additional space between each biomedia apparatus.

Further, the presence of the reinforcing members 20 can help provide a reduction of stretch in the wire and filamentary structures of the invention. Along these lines, the biomedia 10 of the inventors of the present invention believe that it can hold more pounds of weight per foot of biomedia than known structures. The inventors have found that a biomedia apparatus 10 according to the present invention can provide up to 300 pounds of weight per foot. This has the advantages of reducing the risk of the biomedia yielding or even breaking during use in a trickle tower, and enables the trickle tower to process a larger volume of wastewater before needing grooming to reduce growth of microorganisms.

In a modification, the KEVLAR® (light, strong para-aramid synthetic fiber), TENSYLON® (ultrahigh molecular weight polyethylene), wire, etc. can be introduced under tension without the twisting step. The now knitted structure is loaded into a trickle tower in such a way that the small foundation areas are all located in the exact position relative to one another; this configuration allowing the maximum availability of air throughout the media structures.

In another embodiment, the biomedia 10 of the present invention may be used to treat water that enters the water intake valves of power plants. In many cases, the intake valves of power plants draw in the larval form of muscles (often referred to as spat) that typically grow in large bodies of water, like lakes. This spat eventually turns into full-grown muscles that can seriously damage the power plant's filtration systems. To counteract this problem, a frame of the biomedia 10 of the present invention may be submerged outside the water intake valves of power plants. Because the plurality of loops 18 can ensnare the spat before it enters the power plant, the numbers of muscles growing inside the target power plant is reduced, thereby helping to minimize the aforementioned damage to power plant filtration systems.

Variations, modifications and other implementations of what is described herein will occur to those of ordinary skill in the art without departing from the spirit and scope of the invention. Accordingly, the invention is in no way limited by the preceding illustrative description.

What is claimed is:

1. A biomedia apparatus comprising:
an elongated, knitted central core;
at least one reinforcing member formed separately from, interconnected with, and extending along the central core, wherein the at least one reinforcing member is interconnected with the central core by at least one of stitching, knitting, or twisting the reinforcing member; and
a plurality of loops positioned along a length of the central core.

2. The biomedia apparatus of claim 1, wherein the central core is constructed of a yarn-like material.

3. The biomedia apparatus of claim 2, wherein the yarn-like material comprises at least one of a continuous filament and a spun staple yarn.

4. The biomedia apparatus of claim 2, wherein the at least one reinforcing member has a higher tensile strength than that of the yarn-like material.

5. The biomedia apparatus of claim 3, wherein the at least one of a continuous filament and a spun staple yarn is comprised of a material selected from a group consisting of polyester, polyamide, polyvinylidene chloride and polypropylene.

6. The biomedia apparatus of claim 1, wherein the at least one reinforcing member is stitched into the central core.

7. The biomedia apparatus of claim 1, wherein a width of the central core is no greater than about 5 millimeters.

8. The biomedia apparatus of claim 1, wherein a width of the central core is between about 1/7 to about 1/5 of the overall lateral width of the biomedia apparatus.

9. The biomedia apparatus of claim 1, wherein the at least one reinforcing member is at least partially knitted into the central core.

10. The biomedia apparatus of claim 1, wherein the at least one reinforcing member and the central core are twisted about one another.

11. The biomedia apparatus of claim 1, wherein the at least one reinforcing member is introduced into the central core under tension.

12. The biomedia apparatus of claim 1, wherein the at least one reinforcing member is constructed of a material selected from the group consisting of a high strength synthetic filament, tape and stainless steel wire.

13. A biomedia apparatus comprising:
- an elongated, knitted central core, wherein a width of the central core is no greater than about 10.0 millimeters;
- a reinforcing member formed separately from and interconnected with the central core, wherein the reinforcing member is interconnected with the central core by at least one of stitching, knitting, or twisting the reinforcing member; and
- a plurality of loops positioned along the central core.

14. The biomedia apparatus of claim 13, wherein the width dimension of the central core is between about 3.0 mm and about 8.0 mm.

15. A biomedia apparatus comprising:
- an elongated, knitted central core;
- a reinforcing member formed separately from and interconnected with the central core, wherein the reinforcing member is interconnected with the central core by at least one of stitching, knitting, or twisting the reinforcing member; and
- a plurality of loops positioned along the central core for collecting organisms from water, wherein the biomedia apparatus is adapted to hold about 150.0 to about 300.0 pounds of collected organisms per foot.

16. The biomedia apparatus of claim 15, wherein the reinforcing member is stitched into the central core.

17. The biomedia apparatus of claim 15, wherein the reinforcing member is at least partially knitted into the central core.

18. The biomedia apparatus of claim 15, wherein the reinforcing member and the central core are twisted about one another.

19. The biomedia apparatus of claim 15, wherein the reinforcing member is interconnected with the central core under tension.

20. The biomedia apparatus of claim 15, wherein the reinforcing member is constructed of a material selected from the group consisting of a high strength synthetic filament, tape, and stainless steel wire.

* * * * *